(12) United States Patent
Budianu et al.

(10) Patent No.: US 8,792,922 B2
(45) Date of Patent: Jul. 29, 2014

(54) UPLINK SCHEDULING FOR FAIRNESS IN CHANNEL ESTIMATION PERFORMANCE

(75) Inventors: Petru Cristian Budianu, San Diego, CA (US); Alexei Gorokhov, San Diego, CA (US); Dhananjay Ashok Gore, San Diego, CA (US); Ravi Palanki, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 742 days.

(21) Appl. No.: 11/680,233

(22) Filed: Feb. 28, 2007

(65) Prior Publication Data

US 2008/0205333 A1   Aug. 28, 2008

(51) Int. Cl.
*H04B 15/00* (2006.01)

(52) U.S. Cl.
USPC ............ 455/501; 370/329; 375/272; 379/338

(58) Field of Classification Search
CPC ............................ H04B 1/1027; H04W 72/082
USPC ........................................................ 455/501
See application file for complete search history.

(56) References Cited

U.S. PATENT DOCUMENTS

| | | | | | |
|---|---|---|---|---|---|
| 4,583,090 | A * | 4/1986 | Eden et al. | ..................... | 375/272 |
| 5,898,733 | A * | 4/1999 | Satyanarayana | ............... | 375/133 |
| 6,131,013 | A * | 10/2000 | Bergstrom et al. | .......... | 455/63.1 |
| 6,317,470 | B1 * | 11/2001 | Kroeger et al. | ............... | 375/340 |
| 6,725,052 | B1 * | 4/2004 | Raith | ............................ | 455/518 |
| 6,839,573 | B1 * | 1/2005 | Youssefmir et al. | ........ | 455/562.1 |
| 6,920,328 | B2 * | 7/2005 | Wollrab | ..................... | 455/456.1 |
| 7,035,660 | B2 * | 4/2006 | Futakata et al. | ............... | 455/522 |
| 7,062,253 | B2 * | 6/2006 | Money et al. | .................. | 455/406 |
| 7,130,612 | B1 * | 10/2006 | Blewett et al. | ................ | 455/406 |
| 7,151,937 | B2 * | 12/2006 | Jin et al. | ......................... | 455/450 |
| 7,158,804 | B2 | 1/2007 | Kumaran et al. | | |
| 7,177,377 | B2 * | 2/2007 | Wu et al. | ....................... | 375/346 |
| 7,263,131 | B2 * | 8/2007 | Ha et al. | ......................... | 375/260 |
| 7,308,015 | B2 * | 12/2007 | Takano et al. | ................. | 375/130 |

(Continued)

FOREIGN PATENT DOCUMENTS

| | | |
|---|---|---|
| EP | 1294212 | 3/2003 |
| EP | 1414253 | 4/2004 |
| EP | 1746776 | 1/2007 |
| WO | 02093782 | 11/2002 |

OTHER PUBLICATIONS

International Search Report, PCT/US08/055327, International Search Authority, European Patent Office, Jul. 17, 2008.

(Continued)

*Primary Examiner* — Hai V Nguyen
(74) *Attorney, Agent, or Firm* — Howard Seo

(57) ABSTRACT

Systems and methodologies are described that facilitate mitigation of interference through uplink scheduling in a wireless communication environment. Access points can assign multiple terminals to a single tile or segment of shared resource (e.g., a time frequency region) to maximize the number of terminals supported. However, combinations of certain types of terminals can cause a significant increase in interference. In particular, allocating multiple terminals having a relatively high velocity (e.g., terminals located in moving vehicles) to a single tile can cause an unacceptable increase in interference. To mitigate interference, high velocity terminals can be identified. Once identified, terminals can be allocated to the available tiles based at least in part upon avoiding combinations that result in a significant increase in interference.

27 Claims, 10 Drawing Sheets

(56) References Cited

U.S. PATENT DOCUMENTS

| | | | |
|---|---|---|---|
| 7,324,437 B1* | 1/2008 | Czylwik et al. | 370/210 |
| 7,362,822 B2* | 4/2008 | Li et al. | 375/299 |
| 7,394,862 B2* | 7/2008 | Jensen et al. | 375/272 |
| 7,403,571 B2* | 7/2008 | Jeon et al. | 375/267 |
| 7,408,907 B2* | 8/2008 | Diener | 370/338 |
| 7,424,068 B2* | 9/2008 | Visalli et al. | 375/327 |
| 7,424,268 B2* | 9/2008 | Diener et al. | 455/62 |
| 7,430,257 B1* | 9/2008 | Shattil | 375/347 |
| 7,444,169 B2* | 10/2008 | Ishii et al. | 455/561 |
| 7,508,798 B2* | 3/2009 | Tong et al. | 370/337 |
| 7,522,555 B2* | 4/2009 | Li et al. | 370/329 |
| 7,532,675 B2* | 5/2009 | Li et al. | 375/260 |
| 7,539,253 B2* | 5/2009 | Li et al. | 375/260 |
| 7,564,829 B2* | 7/2009 | Jin et al. | 370/343 |
| 7,593,449 B2* | 9/2009 | Shattil | 375/130 |
| 7,623,487 B2* | 11/2009 | Zhang et al. | 370/328 |
| 7,639,985 B2* | 12/2009 | Dickey | 455/63.1 |
| 7,643,843 B2* | 1/2010 | Pan et al. | 455/522 |
| 7,668,102 B2* | 2/2010 | Li et al. | 370/236 |
| 7,702,049 B2* | 4/2010 | Tsui et al. | 375/347 |
| 7,724,722 B2* | 5/2010 | Seo et al. | 370/344 |
| 7,724,858 B2* | 5/2010 | Li et al. | 375/358 |
| 7,796,567 B2* | 9/2010 | Yang | 370/336 |
| 7,809,371 B2* | 10/2010 | Nishio | 455/434 |
| 7,826,415 B2* | 11/2010 | Oh et al. | 370/329 |
| 7,937,111 B2* | 5/2011 | Ishii et al. | 455/561 |
| 8,009,551 B2* | 8/2011 | Wang | 370/208 |
| 8,027,243 B2* | 9/2011 | Jin et al. | 370/206 |
| 8,054,905 B2* | 11/2011 | Shnaider et al. | 375/267 |
| 8,200,159 B2* | 6/2012 | Dussauby et al. | 455/62 |
| 8,249,607 B2* | 8/2012 | McBeath et al. | 455/450 |
| 8,576,784 B2* | 11/2013 | L hr et al. | 370/329 |
| 2002/0037034 A1* | 3/2002 | Penther | 375/229 |
| 2003/0027588 A1* | 2/2003 | Futakata et al. | 455/522 |
| 2004/0009761 A1* | 1/2004 | Money et al. | 455/406 |
| 2004/0028003 A1* | 2/2004 | Diener et al. | 370/319 |
| 2004/0047324 A1* | 3/2004 | Diener | 370/338 |
| 2004/0125862 A1* | 7/2004 | Li et al. | 375/147 |
| 2004/0137931 A1* | 7/2004 | Sarkar et al. | 455/522 |
| 2004/0156308 A1* | 8/2004 | Ha et al. | 370/206 |
| 2004/0156456 A1* | 8/2004 | Wu et al. | 375/346 |
| 2005/0069046 A1* | 3/2005 | Tsui et al. | 375/260 |
| 2005/0117553 A1* | 6/2005 | Wang et al. | 370/338 |
| 2005/0141459 A1* | 6/2005 | Li et al. | 370/334 |
| 2005/0141540 A1* | 6/2005 | Li et al. | 370/437 |
| 2005/0190817 A1* | 9/2005 | Batra et al. | 375/130 |
| 2005/0202822 A1* | 9/2005 | Park et al. | 455/436 |
| 2005/0220116 A1 | 10/2005 | Ahn et al. | |
| 2005/0226277 A1* | 10/2005 | Li et al. | 370/536 |
| 2005/0237971 A1* | 10/2005 | Skraparlis | 370/329 |
| 2005/0286408 A1* | 12/2005 | Jin et al. | 370/208 |
| 2006/0013185 A1* | 1/2006 | Seo et al. | 370/343 |
| 2006/0056531 A1* | 3/2006 | Li et al. | 375/267 |
| 2006/0085545 A1* | 4/2006 | Borella et al. | 709/227 |
| 2006/0092054 A1* | 5/2006 | Li et al. | 341/67 |
| 2006/0114975 A1* | 6/2006 | Li et al. | 375/219 |
| 2006/0115015 A1* | 6/2006 | Oh et al. | 375/267 |
| 2006/0126513 A1* | 6/2006 | Li et al. | 370/236 |
| 2006/0135169 A1* | 6/2006 | Sampath et al. | 455/447 |
| 2006/0165008 A1* | 7/2006 | Li et al. | 370/252 |
| 2007/0019668 A1* | 1/2007 | Lee et al. | 370/458 |
| 2007/0030820 A1* | 2/2007 | Sarkar et al. | 370/315 |
| 2007/0036100 A1* | 2/2007 | Shaffer et al. | 370/328 |
| 2007/0036118 A1* | 2/2007 | Shaffer et al. | 370/338 |
| 2007/0037596 A1* | 2/2007 | Shaffer et al. | 455/518 |
| 2007/0047479 A1* | 3/2007 | Shaffer et al. | 370/328 |
| 2007/0047671 A1* | 3/2007 | Chen | 375/326 |
| 2007/0086406 A1* | 4/2007 | Papasakellariou | 370/343 |
| 2007/0087756 A1* | 4/2007 | Hoffberg | 455/450 |
| 2007/0097915 A1* | 5/2007 | Papasakellariou | 370/329 |
| 2007/0104121 A1* | 5/2007 | Shaffer et al. | 370/276 |
| 2007/0105578 A1* | 5/2007 | Shaffer et al. | 455/518 |
| 2007/0105579 A1* | 5/2007 | Shaffer et al. | 455/519 |
| 2007/0115800 A1* | 5/2007 | Fonseka et al. | 370/208 |
| 2007/0116094 A1* | 5/2007 | Parts et al. | 375/130 |
| 2007/0129111 A1* | 6/2007 | Kim et al. | 455/562.1 |
| 2007/0147520 A1* | 6/2007 | Li et al. | 375/260 |
| 2007/0155387 A1* | 7/2007 | Li et al. | 455/441 |
| 2007/0177501 A1* | 8/2007 | Papasakellariou | 370/229 |
| 2007/0202907 A1* | 8/2007 | Shaffer et al. | 455/518 |
| 2007/0202908 A1* | 8/2007 | Shaffer et al. | 455/518 |
| 2007/0211786 A1* | 9/2007 | Shattil | 375/141 |
| 2007/0226310 A1* | 9/2007 | Shaffer et al. | 709/207 |
| 2007/0230412 A1* | 10/2007 | McBeath et al. | 370/338 |
| 2007/0239824 A1* | 10/2007 | Shaffer et al. | 709/204 |
| 2007/0270172 A1* | 11/2007 | Kalley et al. | 455/518 |
| 2007/0274252 A1* | 11/2007 | Zhang et al. | 370/328 |
| 2007/0274288 A1* | 11/2007 | Smith et al. | 370/351 |
| 2007/0274460 A1* | 11/2007 | Shaffer et al. | 379/37 |
| 2007/0280195 A1* | 12/2007 | Shaffer et al. | 370/351 |
| 2007/0280203 A1* | 12/2007 | Shaffer et al. | 370/352 |
| 2008/0008255 A1* | 1/2008 | Jain et al. | 375/260 |
| 2008/0039107 A1* | 2/2008 | Ma et al. | 455/450 |
| 2008/0039133 A1* | 2/2008 | Ma et al. | 455/552.1 |
| 2008/0049820 A1* | 2/2008 | Jia et al. | 375/227 |
| 2008/0070510 A1* | 3/2008 | Doppler et al. | 455/69 |
| 2008/0075182 A1* | 3/2008 | Hsieh et al. | 375/260 |
| 2008/0102869 A1* | 5/2008 | Shaffer et al. | 455/518 |
| 2008/0125048 A1* | 5/2008 | Pi | 455/63.1 |
| 2008/0152052 A1* | 6/2008 | Thomas | 375/346 |
| 2008/0159128 A1* | 7/2008 | Shaffer et al. | 370/229 |
| 2008/0205333 A1* | 8/2008 | Budianu et al. | 370/329 |
| 2008/0249997 A1* | 10/2008 | Sun et al. | 707/3 |
| 2008/0259846 A1* | 10/2008 | Gonikberg et al. | 370/328 |
| 2008/0263137 A1* | 10/2008 | Pattison et al. | 709/203 |
| 2008/0279138 A1* | 11/2008 | Gonikberg et al. | 370/328 |
| 2008/0279162 A1* | 11/2008 | Desai | 370/338 |
| 2008/0279163 A1* | 11/2008 | Desai | 370/338 |
| 2008/0279264 A1* | 11/2008 | Desai et al. | 375/220 |
| 2008/0280637 A1* | 11/2008 | Shaffer et al. | 455/519 |
| 2008/0298488 A1* | 12/2008 | Shen et al. | 375/260 |
| 2008/0299940 A1* | 12/2008 | Shaffer et al. | 455/404.2 |
| 2008/0299987 A1* | 12/2008 | Iyer et al. | 455/454 |
| 2008/0313711 A1* | 12/2008 | Christenson et al. | 726/4 |
| 2008/0316957 A1* | 12/2008 | Shen et al. | 370/328 |
| 2009/0042572 A1* | 2/2009 | Craig et al. | 455/436 |
| 2009/0046625 A1* | 2/2009 | Diener et al. | 370/319 |
| 2009/0049202 A1* | 2/2009 | Pattison et al. | 709/249 |
| 2009/0052381 A1* | 2/2009 | Gorokhov et al. | 370/329 |
| 2009/0110033 A1* | 4/2009 | Shattil | 375/141 |
| 2009/0116434 A1* | 5/2009 | Lohr et al. | 370/329 |
| 2009/0129334 A1* | 5/2009 | Ma et al. | 370/331 |
| 2009/0129495 A1* | 5/2009 | Jin et al. | 375/260 |
| 2009/0175366 A1* | 7/2009 | Maltsev et al. | 375/260 |
| 2009/0190537 A1* | 7/2009 | Hwang et al. | 370/329 |
| 2009/0201917 A1* | 8/2009 | Maes et al. | 370/352 |
| 2009/0202011 A1* | 8/2009 | Li et al. | 375/260 |
| 2009/0215411 A1* | 8/2009 | Tucker et al. | 455/90.2 |
| 2009/0257393 A1* | 10/2009 | Li et al. | 370/329 |
| 2009/0303918 A1* | 12/2009 | Ma et al. | 370/315 |
| 2009/0323602 A1* | 12/2009 | Li et al. | 370/329 |
| 2010/0105406 A1* | 4/2010 | Luo et al. | 455/452.2 |
| 2010/0142471 A1* | 6/2010 | Cheng et al. | 370/329 |
| 2010/0220668 A1* | 9/2010 | Yamada et al. | 370/329 |
| 2010/0235285 A1* | 9/2010 | Hoffberg | 705/75 |
| 2011/0222448 A1* | 9/2011 | Ofek et al. | 370/310 |
| 2012/0020403 A1* | 1/2012 | Jia et al. | 375/227 |
| 2012/0314570 A1* | 12/2012 | Forenza et al. | 370/230 |
| 2013/0077469 A1* | 3/2013 | Ma et al. | 370/210 |

OTHER PUBLICATIONS

Written Opinion, PCT/US08/055327, International Search Authority, European Patent Office, Jul. 17, 2008.

Taiwan Search Report—TW097107402—TIPO—Aug. 24, 2011.

* cited by examiner

UPLINK SCHEDULING FOR FAIRNESS IN CHANNEL ESTIMATION PERFORMANCE

BACKGROUND

I. Field

The following description relates generally to wireless communications, and, amongst other things, to mitigation of interference.

II. Background

Wireless networking systems have become a prevalent means by which a majority of people worldwide has come to communicate. Wireless communication devices have become smaller and more powerful in order to meet consumer needs and to improve portability and convenience. Consumers have become dependent upon wireless communication devices such as cellular telephones, personal digital assistants (PDAs) and the like, demanding reliable service, expanded areas of coverage and increased functionality.

Generally, a wireless multiple-access communication system may simultaneously support communication for multiple wireless terminals or user devices. Each terminal communicates with one or more access points via transmissions on the forward and reverse links. The forward link (or downlink) refers to the communication link from the access points to the terminals, and the reverse link (or uplink) refers to the communication link from the terminals to the access points.

Wireless systems may be multiple-access systems capable of supporting communication with multiple users by sharing the available system resources (e.g., bandwidth and transmit power). Examples of such multiple-access systems include orthogonal frequency division multiple access (OFDMA) systems. Typically, each access point supports terminals located within a specific coverage area referred to as a sector. The term "sector" can refer to an access point and/or an area covered by an access point, depending upon context. Terminals within a sector can be allocated specific resources (e.g., time and frequency) to allow simultaneous support of multiple terminals.

SUMMARY

The following presents a simplified summary of one or more aspects in order to provide a basic understanding of such aspects. This summary is not an extensive overview of all contemplated aspects, and is intended to neither identify key or critical elements of all aspects nor limit the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with mitigating interference in a wireless system. In multi-access wireless systems, access points typically allocate shared resources among one or more terminals. To maximize the number of terminals that can be supported by an access point, an access point can assign multiple terminals to a single segment of shared resource (e.g., a time frequency region), referred to herein as a tile. However, combinations of certain types of terminals sharing a tile, referred to herein as high interference combinations, can cause a significant increase in interference, resulting in a reduction of the channel estimation performance. In particular, allocating multiple terminals having a relatively high velocity (e.g., terminals located in moving vehicles) to a single tile can cause an unacceptable increase in interference and loss of performance. Therefore, when it is necessary for multiple terminals to share a single tile, high velocity terminals can be identified. Once identified, terminals can be allocated to available tiles based at least in part upon avoiding such high interference combinations, ensuring fairness in channel estimation performance. When such combinations are unavoidable, terminals participating in the high interference combinations can be randomly selected to ensure that any impact upon channel performance is equitably distributed among the terminals.

In an aspect, the present disclosure provides a method for mitigating interference utilizing uplink scheduling, which comprises categorizing a set of terminals as a function of variation of a channel of each of the set of terminals. In addition, the method comprises mitigating interference by way of allocating the set of categorized terminals to a set of tiles, so as to minimize occurrence of high interference combinations of categorized terminals.

In another aspect, the present disclosure provides an apparatus that facilitates mitigation of interference, which comprises a memory that stores categorization information. In addition, the apparatus includes a processor configured to categorize a set of terminals as a function of time domain variations associated with each of the set of terminals. The processor is also configured to mitigate interference by way of allocating the set of categorized terminals to a set of tiles, so as to minimize occurrence of high interference combinations of categorized terminals.

According to yet another aspect, the present disclosure provides an apparatus that mitigates interference, which comprises means for categorizing a set of terminals as a function variation of channel of each of the set of terminals. The apparatus also comprises means for assigning the set of categorized terminals to a tile set, so as to mitigate interference associated with high interference combinations of categorized terminals.

According to another aspect, the present disclosure provides a computer program product that comprises a computer-readable medium. The computer-readable medium comprises code for causing a computer to categorize a set of terminals as a function of time domain variations of each of the set of terminals. In addition, the computer-readable medium comprises code for causing the computer to mitigate interference by way of allocating the set of categorized terminals to a set of tiles, so as to minimize occurrence of high interference combinations of categorized terminals.

To the accomplishment of the foregoing and related ends, the one or more aspects comprise the features hereinafter fully described and particularly pointed out in the claims. The following description and the annexed drawings set forth in detail certain illustrative aspects. These aspects are indicative, however, of but a few of the various ways in which the principles described herein may be employed and the described aspects are intended to include their equivalents.

DETAILED DESCRIPTION

Figure 1:
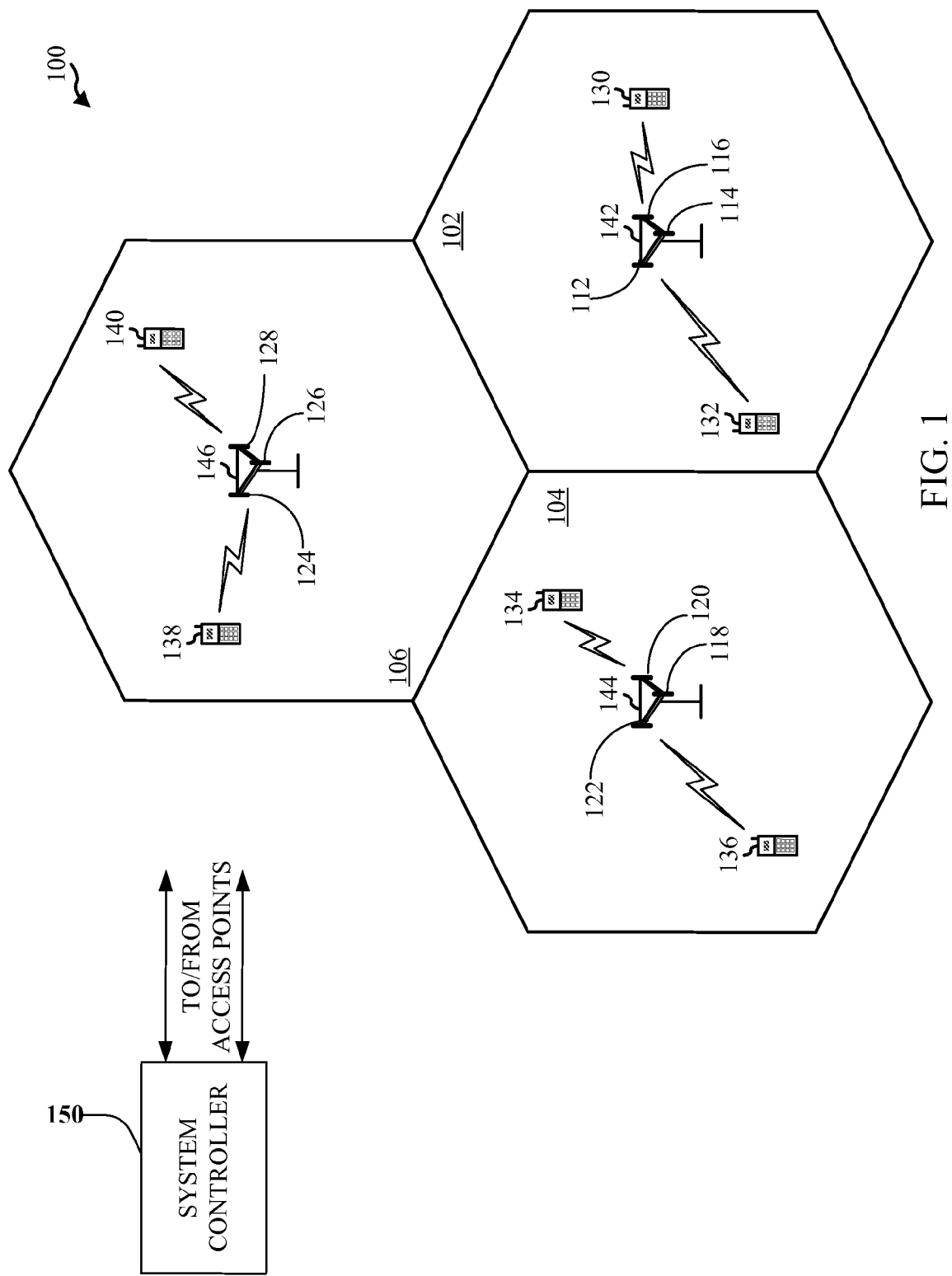
FIG. 1 is an illustration of a wireless communication system in accordance with one or more aspects presented herein.

Various aspects are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects.

As used in this application, the terms "component," "system," and the like are intended to refer to a electronic device related entity, either hardware, a combination of hardware and software, software, firmware, or software in execution. For example, a component may be, but is not limited to being, a process running on a processor, a processor, an object, an executable, a thread of execution, a program, and/or a computer. By way of illustration, both an application running on a communications device and the device can be a component. One or more components may reside within a process and/or thread of execution and a component may be localized on one computer and/or distributed between two or more computers. Also, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a terminal. A terminal can also be called a system, a user device, a subscriber unit, subscriber station, mobile station, mobile device, remote station, access point, base station, remote terminal, access terminal, user terminal, terminal, user agent, or user equipment (UE). A terminal can be a cellular telephone, a cordless telephone, a Session Initiation Protocol (SIP) phone, a wireless local loop (WLL) station, a PDA, a handheld device having wireless connection capability, or other processing device connected to a wireless modem.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Turning now to the Figures, FIG. 1 illustrates a multiple access wireless communication system 100. Multiple access wireless communication system 100 includes multiple access points 142, 144 and 146. An access point provides communication coverage for a respective geographic area. An access point and/or its coverage area may be referred to as a "cell", depending on the context in which the term is used. For example, the multiple access wireless communication system 100 includes multiple cells 102, 104, and 106. To improve system capacity, an access point coverage area can be partitioned into multiple smaller areas, referred to as sectors. Each sector is served by a respective base transceiver subsystem (BTS). The term "sector" can refer to a BTS and/or its coverage area depending upon context. For a sectorized cell, the base transceiver subsystem for all sectors of the cell is typically co-located within the access point for the cell. The multiple sectors may be formed by groups of antennas each responsible for communication with access terminals in a portion of the cell. For example, in cell 102, antenna groups 112, 114, and 116 each correspond to a different sector. In cell 104, antenna groups 118, 120, and 122 each correspond to a different sector. In cell 106, antenna groups 124, 126, and 128 each correspond to a different sector.

Each cell can include multiple access terminals that may be in communication with one or more sectors of each access point. For example, access terminals 130 and 132 are in communication with access point 142, access terminals 134 and 136 are in communication with access point 144, and access terminals 138 and 140 are in communication with access point 146.

It can be seen from FIG. 1 that each access terminal 130, 132, 134, 136, 138, and 140 is located in a different portion of its respective cell relative to each other access terminal in the same cell. Further, each access terminal may be at a different distance from the corresponding antenna groups with which it is communicating. Both of these factors provide situations, due to environmental and other conditions in the cell, which cause different channel conditions to be present between each access terminal and the corresponding antenna group with which it is communicating.

For a centralized architecture, a system controller 150 is coupled to access points 142, 144 and 146, provides coordination and control of access points 142, 144 and 146, and further controls the routing of data for the terminals served by these access points. For a distributed architecture, access points 142, 144 and 146 may communicate with one another as needed, e.g., to serve a terminal in communication with an access points, to coordinate the usage of subbands, and so on. Communication between access points via system controller 150 or the like can be referred to as backhaul signaling.

As used herein, an access point can be a fixed station used for communicating with the terminals and may also be referred to as, and include some or all the functionality of, a base station. An access terminal may also be referred to as, and include some or all the functionality of, a user equipment (UE), a wireless communication device, a terminal, a mobile station or some other terminology.

An access point can manage multiple terminals by sharing the available system resources (e.g., bandwidth and transmit power) among the terminals. For example, in an orthogonal frequency division multiple access (OFDMA) systems, available frequency bandwidth is divided into segments. As used herein, a tile is a time frequency region that comprises a predetermined number of successive tones for a fixed number of successive OFDM symbols. For example, a tile may include sixteen tones for 128 OFDM symbols. The access point can allocate terminals to set of available tiles, such that the terminals may transmit uplink signals based upon the resources (e.g., time frequency region) of the tile to which the terminal has been assigned.

Access points can schedule uplink transmission by assigning one or more terminals to a set of tiles via a resource assignment channel, such as the shared signaling channel (F-SSCH) as defined in the proposed IEEE 802.20 protocol. The resource assignment channel can include forward link control signaling. Resources can be assigned via the resource assignment channel, which can be present in every physical layer (PHY) frame from the transmitting access point. Moreover, the resource assignment channel can be present in every forward link physical layer frame (FL PHY frame). Consequently, frequency assignment communications can be transmitted as rapidly as once every FL PHY frame. Therefore, the access point can update the allocation of terminals to tiles extremely quickly.

In general, when possible, terminals are assigned to separate tiles such that a tile supports no more than one terminal at a time. Allocation of multiple terminals to a single tile can result in cross-channel interference and can adversely affect performance. Two or more terminals allocated to the same tile will share resources associated with the tile, which can affect the communication signals between terminals and access points, increasing transmission time and decreasing effective communication.

Despite possible interference, access points can schedule multiple terminals to a single tile to maximize the number of terminals supported by the communication system. For example, when the number of terminals within a sector exceeds the total number of available tiles, multiple terminals can be assigned to a tile to provide service to all of the terminals. Although multiple assignments can result in interference, such interference may be preferable to refusal of service or interruption of service for one or more terminals. If interference is limited, an acceptable level of performance can be maintained for terminals within the communication system.

Channel estimation may not be capable of tracking rapid time-domain variations in a channel for a terminal. Large variations can have a similar effect as increases in noise or interference power. Difficulties or errors in channel estimation due to such variations can result in interference. In general, terminals with a relatively high velocity (e.g., a mobile device located in an automobile) experience relatively large time-domain variations, resulting in high levels of interference. Additionally, untrackable channel variations can also hinder channel estimation for other terminals sharing the same resources (e.g., tiles). The interference levels are increased when multiple high velocity terminals are allocated to a single tile. While multiple allocations of terminals to a tile will typically result in a reduction of channel estimation performance, regardless of the velocity of the allocated terminals, when two or more high-velocity terminals are allocated to the same tile, the terminals may experience a significant decrease in performance.

As a first step in mitigating interference, terminals that are likely to experience high rates of interference or large time domain variations can be identified and categorized as a function of the amount of channel variation for a terminal. In particular, terminals can be categorized based upon their velocity. For example, terminals with a relatively high velocity can be classified or categorized as fast-moving, while terminals that are stationary or have a relatively low velocity can be classified as slow-moving. For instance, a terminal located in a moving vehicle (e.g., automobile, train, etc.) can be classified as fast-moving, and a terminal carried by a pedestrian may be classified as slow-moving. Examples herein also use the terms 'pedestrian terminals' and 'vehicular terminals' to refer to slow-moving terminals and fast-moving terminals, respectively. However, these examples are not limited to a particular mode of transportation. Pedestrians and vehicles are simply illustrative of typical divisions in the relative rates of transportation. In addition, classifications are not limited to these two example classes. Any number of classifications can be utilized to classify terminals based upon velocity or any other indicia of time domain variation.

Although all terminals are affected to some degree by sharing a tile, the effects are noticeably different based upon the classes of the terminals that are combined. Effects of combining two or more terminals for a single tile can be shown by examining channel estimates of the terminals. In wireless communication systems, estimates of the response of a wireless channel from a transmitter to a receiver can be used for a variety of purposes, including data detection, time synchronization, frequency correction, spatial processing, rate selection, etc. Table 1 depicts the relative channel estimation performance for various combinations of classes of terminals:

TABLE 1

| Channel Estimation Performance | | |
|---|---|---|
| | Slow-moving terminal | Fast-moving terminal |
| Slow-moving terminal performance | excellent | very good |
| Fast-moving terminal performance | good | poor |

The example depicted in Table 1 utilizes two classes, slow-moving (e.g., a terminal carried by a pedestrian) and fast-moving (e.g., a terminal located in a moving vehicle), and depicts the effects of sharing a tile between two terminals. The effects on the terminals for the four possible combinations are shown. In general, slow-moving terminals have relatively high channel estimation performance. As shown in the first row of the table, the slow-moving terminal experiences a very low or minor reduction in channel estimate performance when the terminal is scheduled with another slow-moving terminal on a single tile. Although the channel estimation performance is reduced when a slow-moving terminal is scheduled with a fast-moving terminal on a single tile, the resulting performance for the slow-moving terminal is still better than the channel estimation performance of a fast-moving terminal scheduled alone on a single tile. Conversely, fast-moving terminals have lower base levels of channel estimation performance. Consequently, when a fast-moving terminal shares a tile with a slow-moving terminal, the fast-moving terminal experiences a very small reduction in channel estimation performance. However, when the fast-moving terminal shares a tile with another fast-moving terminal, both terminals experience a significant drop in channel estimation performance. Overall, a desirable scheduling method may try to ensure that a reasonable channel estimation performance is achieved for as many terminals as possible.

Uplink transmissions of terminals can be scheduled by access points to mitigate interference and ensure that a minimum level of performance is provided by the communication system. As shown in Table 1, the combination of two or more fast-moving terminals has a large, negative effect upon performance. Combinations of multiple fast-moving terminals allocated to a single tile are referred to herein as high interference combinations. While combinations of slower-moving terminals can also cause interference and reductions in channel estimate performance, the effects are less than those of high interference combinations. Even with the reductions in performance due to sharing of resources, slower-moving terminals are more likely to maintain a performance level above minimum system requirements, such as a minimum guaranteed performance.

Referring to FIGS. 2, 3, 5 and 7, methodologies for uplink scheduling are illustrated. While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with one or more aspects.

It will be appreciated that inferences can be made regarding classification of terminal, etc. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic, that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 2:
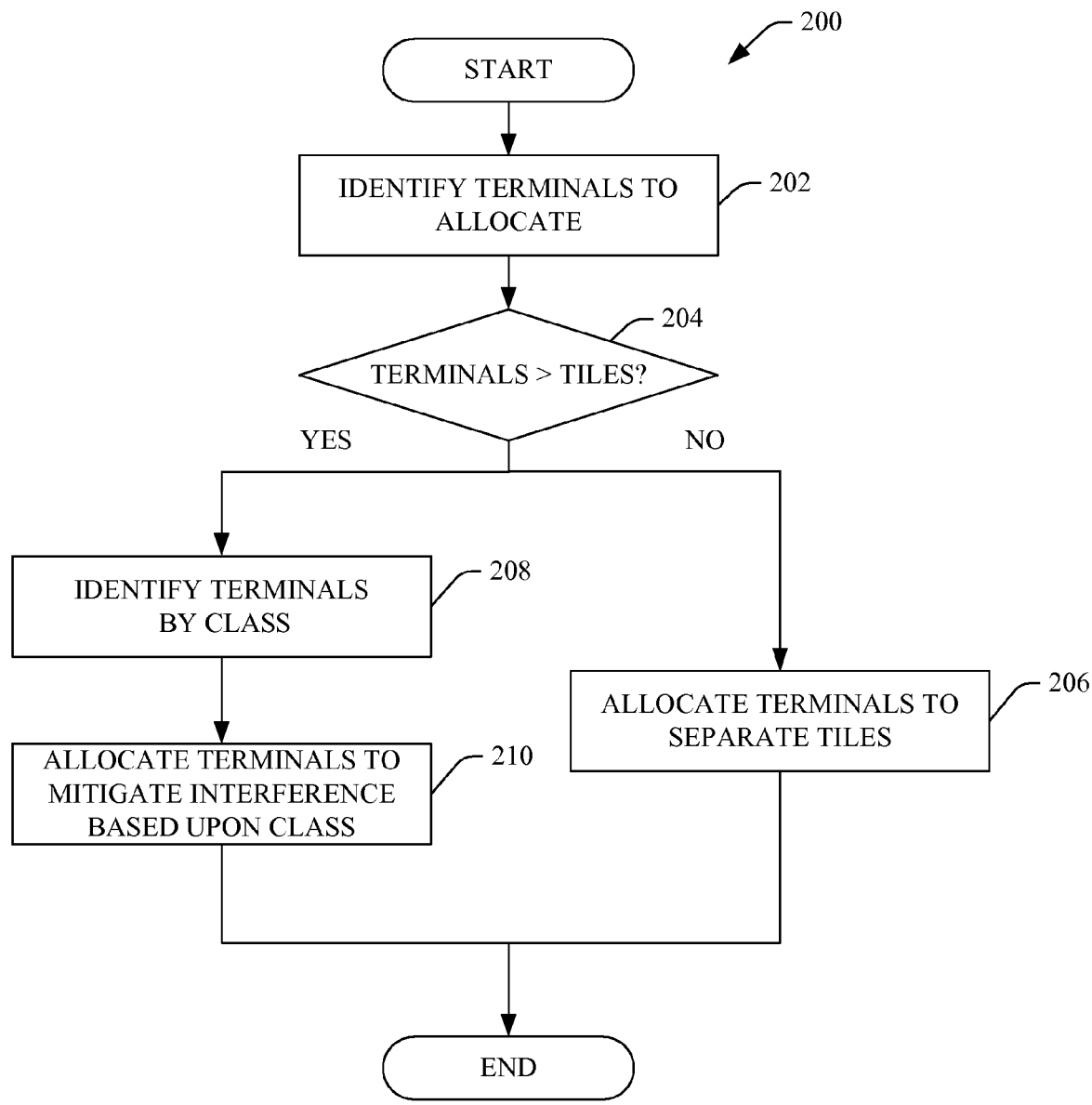
FIG. 2 illustrates a methodology for scheduling uplink transmission to mitigate interference in accordance with one or more aspects presented herein.

Turning now to FIG. 2, a methodology 200 for mitigating interference based upon scheduling of uplink transmissions is illustrated. At 202, terminals that are to be allocated to available tiles are identified. Typically, the identified terminals may include any terminals located within the sector and supported by the access point that will be transmitting uplink signals within a specified period of time. At 204, a determination can be made as to whether the number of identified terminals exceeds the number of available tiles. If no, then each terminal can be assigned to a separate tile at 206. In such cases, there will be no interference or loss of channel estimate performance based upon cross-channel interference.

If there are more terminals to be scheduled than tiles, the terminals can be classified based upon velocity or channel profile of the terminals at 208. Velocity of a terminal can be estimated or computed using a variety of methods. For example, relatively high velocity can cause a reduction in channel estimate performance. Accordingly, channel estimate performance can be used to identify terminals moving at a high velocity. Alternatively, velocity can be computed based upon location information. Terminal locations can be determined based upon GPS, various triangulation methodologies and the like. An average velocity can be determined for a period of time based upon changes in location. Terminals can be classified based upon any indicia of channel variations.

Terminals can be classified based upon computed velocity or variation information, including velocity estimates based upon performance and/or location information. For example, terminals can be classified as either fast-moving or slow-moving. However, any number of classifications can be utilized. Terminals can be classified based upon comparison of velocity information to a predetermined threshold or thresholds. Alternatively, velocity information for the each of the set of terminals can be analyzed relative to other members of the set. For instance, velocities greater than the average velocity of the terminals can be classified as fast-moving, while velocities smaller than the average velocity can be classified as slow-moving.

At 210, terminals are allocated to tiles utilizing the identified classifications to avoid high interference combinations. As determined at 204, there are more terminals than available tiles; consequently, at least one tile will have multiple terminals assigned. However, an access point can assign terminals to tiles while attempting to avoid high interference combinations (e.g., two or more fast-moving terminals assigned to the same tile). Whenever possible, the access point can assign two or more slow-moving terminals or a combination including one slow and one fast-moving terminal to a tile. Uplink transmissions can be scheduled by the access point using the resource assignment channel.

Figure 3:
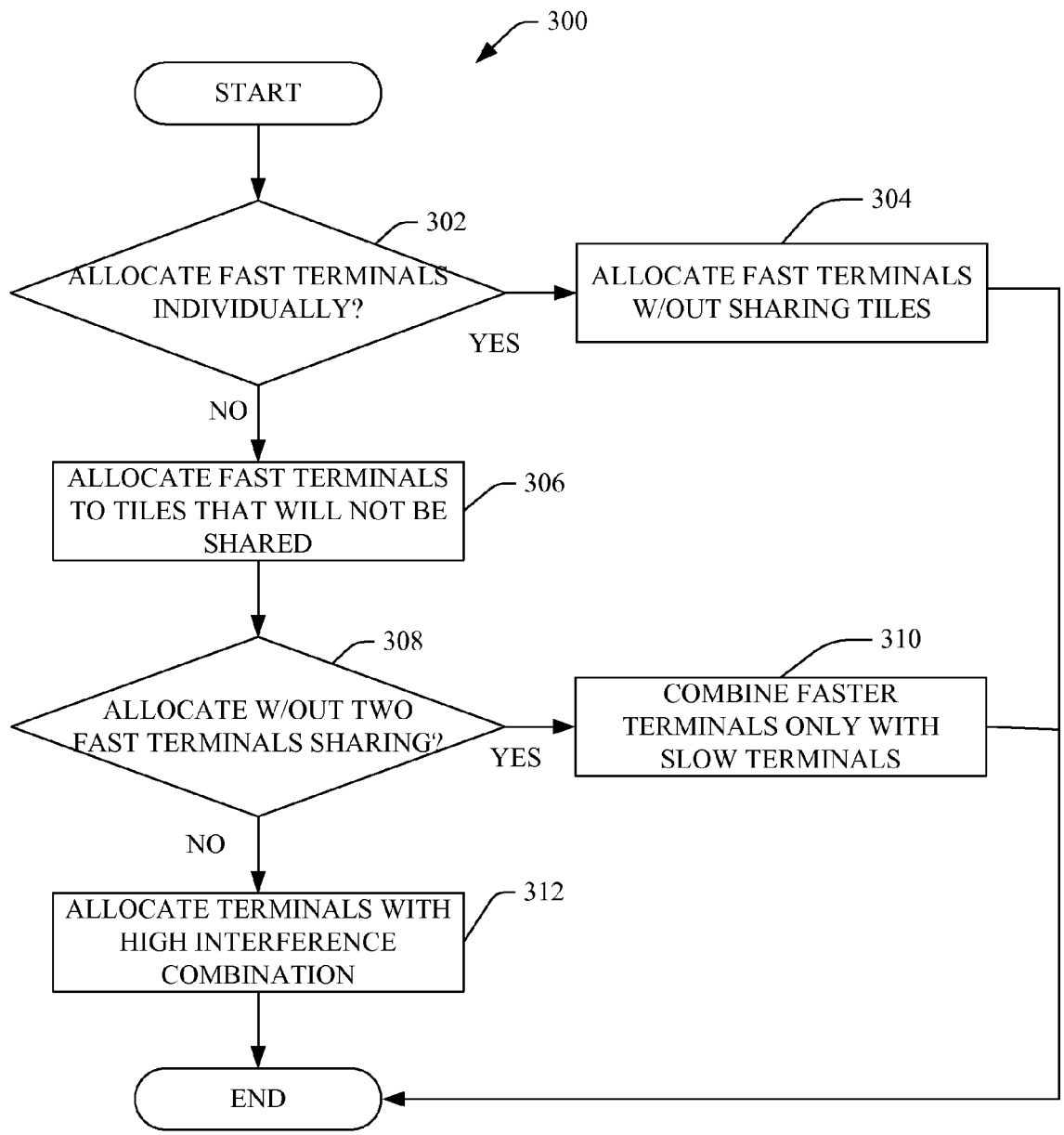
FIG. 3 illustrates a methodology for allocating resources to mitigate interference in accordance with one or more aspects presented herein.

Turning now to FIG. 3, a methodology 300 for allocating terminals to a set of tiles, while mitigating interference is illustrated. A wide array of methods or algorithms can be utilized to allocate terminals based upon terminal classification. The methodology 300 is merely an example of such algorithms. Here, it has already been determined that there are more terminals than available tiles and therefore, the access point will allocate multiple terminals to at least one tile. At 302, a determination is made as to whether each fast-moving terminal, also referred to herein as a vehicular terminal, can be allocated to a tile without requiring such terminals to share a tile with any other terminal, whether fast or slow-moving.

The following exemplary formula can be utilized to determine whether each fast-moving terminal can be assigned to a tile without sharing:

$$N_{fast} \leq N_{tiles} - N_{slow}/2$$

Here, two classes of terminals are utilized and each tile can support a maximum of two terminals. $N_{tiles}$ is the number of tiles available for uplink scheduling, $N_{fast}$ is the number of fast-moving or vehicular terminals, and $N_{slow}$ is the number of slow-moving terminals, also referred to herein as pedestrian terminals. To determine whether it is possible to allocate each fast-moving terminal to an individual tile, the number of tiles required for slow-moving terminals ($N_{slow}/2$) is subtracted from the number of total tiles ($N_{tiles}$). If the remaining tiles are greater than or equal to the number of fast-moving terminals ($N_{fast}$), then each fast-moving terminal can be allocated to its own tile.

If there are sufficient tiles, at 304, each fast-moving terminal is allocated to an individual tile and slow-moving terminals are allocated to the remaining tiles. Allocating fast-moving terminals to individual tiles can result in better, overall performance than pairing a fast-moving terminal with a slow-moving terminal. While any sharing of resources can result in interference and a reduction in channel estimate performance, fast-moving terminals already experience a higher level of interference than slow-moving terminals. Consequently, even the relatively low level of additional interference caused by pairing a fast-moving terminal with a slow-moving terminal can reduce performance below a minimum, acceptable threshold. Combinations of slow-moving terminals are less likely to result in a significant reduction of channel estimate performance.

If there are not enough tiles to allocate a separate tile to each fast-moving terminal, at 306, fast-moving terminals are allocated to each tile that will not be required to be shared by multiple terminals. The following exemplary equation can be used to determine the number of tiles that can be set aside for individual, fast-moving terminals:

$$N_{v1}=2*N_{tiles}-(N_{fast}+N_{slow})$$

Here, $N_{v1}$ is the number of tiles assigned to individual fast-moving terminals. $N_{v1}$ can be calculated by subtracting the total number of terminals $(N_{fast}+N_{slow})$ from the total resources available for allocation. In this example, total resources are equal to twice the number of tiles $(2*N_{tiles})$, where two terminals can share each tile.

At 308, a determination can be made as to whether the remaining fast-moving terminals can be allocated without requiring two fast-moving terminals to share a tile. If the remaining fast-moving terminals can be allocated using half of the remaining, unallocated tiles, then terminals can be allocated without a high interference combination of terminals. The determination can be made utilizing the following example formula:

$$N_{v2}<=N_0/2$$

If $N_{v2}$ is less than, or equal to, $N_0/2$, then fast-moving terminals can be allocated without two such terminals sharing a tile. Here, $N_{v2}$ is the number of fast-moving terminals that remain unallocated:

$$N_{v2}=N_{fast}-N_{v1}$$

And $N_0$ is the number of the unallocated tiles:

$$N_0=N_{fast}+N_{slow}-N_{tiles} \text{ or } N_{tiles}-N_{v1}$$

If it is determined that two fast-moving terminals will not be required to share a tile, then the remaining fast-moving terminals can be scheduled in the remaining unallocated tiles at 310.

In embodiments, one or more tree data structures can be utilized to group and manage available tiles and terminal allocations. The leaves or nodes of the tree structure can represent tiles. In particular, a first tree can represent the first terminal allocated to each tile, where a second, corresponding tree structure represents the second terminal allocated to each of the set of tiles. In the example above, the remaining fast-moving terminals $(N_{v2})$ can be allocated to the first tree and slow-moving terminals can be allocated to the nodes of the second tree. As a result, two fast-moving terminals will not be scheduled in the same tile.

Referring once again to FIG. 3, if it was determined at 308 that two fast-moving terminals will be required to share a tile, then the terminal allocation will include at least one high interference combination of terminals. At 312, the terminals can be allocated such that occurrences of high interference combinations are distributed fairly or equitably among the fast-moving terminals. In addition, terminals can be allocated so as to minimize the occurrence of high interference combinations. Methods for performing such allocations are discussed in further detail below with respect to FIG. 5.

Figure 4:
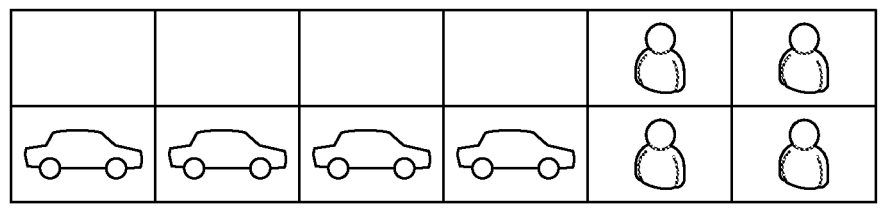
FIG. 4 illustrates exemplary allocations of terminals in accordance with one or more aspects presented herein.
Figure 4:
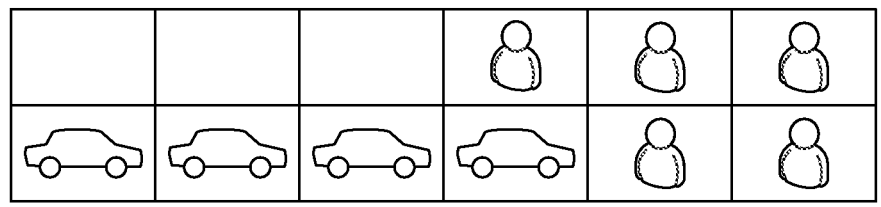

Referring now to FIG. 4, exemplary allocations of terminals are depicted. For simplicity, following examples utilize only two classes of terminals: fast-moving and slow-moving. Fast-moving terminals are represented as vehicular terminals (e.g., automobiles) and slow-moving terminals are represented as pedestrian terminals. In each example, a set of six tiles with a maximum allocation of two terminals per tile is depicted. The set of tiles is represented by the grid structure, where each column represents a tile. Terminals are represented by the simple line drawings of vehicles and pedestrians.

In the first example 400, eight terminals, including four pedestrian terminals and four vehicular terminals are allocated to the set of tiles. The number of total terminals, including both vehicular and pedestrian, is greater than the number of tiles in the set, consequently, at least two terminals will have to share a tile.

Referring once again to the methodology illustrated in FIG. 3, at reference numeral 302, a determination is made as to whether each vehicular terminal can be allocated without requiring the vehicular terminals to share with any other terminals, whether vehicular or pedestrian. In the first example 400, the number of vehicular terminals is equal to the total number of tiles less the number of tiles required for pedestrian terminals (e.g., $N_{veh}=N_{tiles}-N_{ped}/2$ or $4=6-4/2$). Consequently, each vehicle terminal can be separately allocated to a tile, leaving the pedestrian terminals to share remaining tiles.

In the second example 402, five pedestrian terminals and four vehicular terminals are to be allocated to the same set of six tiles. Here, the vehicular terminals cannot be allocated without requiring a vehicular terminal to share a tile with a pedestrian terminal. The number of vehicular terminals $(N_{fast})$ is greater than the number of tiles $(N_{tiles})$ less the number of tiles required for pedestrian terminals $(N_{slow}/2)$ (e.g., $N_{fast}>N_{tiles}-N_{slow}/2$). Consequently, vehicular terminals cannot be allocated to tiles without any sharing of resources.

Referring once again to the methodology of FIG. 3, at reference numeral 306 vehicular terminals can be allocated to each tile that will not be allocated to multiple terminals. The number of vehicular terminals to be allocated, $N_{v1}$, can be computed as follows:

$$N_{v1}=2*N_{tiles}-(N_{fast}+N_{slow})$$

Consequently, three vehicular terminals can be allocated to tiles, without requiring such terminals to share the tile.

Next, at reference numeral 308, a determination can be made as to whether the remaining vehicular terminals can be allocated without combining two vehicular terminals and creating a high interference combination. This can be determined by comparing the number of remaining vehicular terminals and half the number of unallocated tiles. In the second example 402, there is only one remaining vehicular terminal and two tiles that have not yet been assigned a terminal. Consequently, the remaining vehicular terminal can be scheduled in one of the tiles that have not yet been assigned a terminal without creating a high interference combination. The remaining pedestrian terminals can then be allocated. Here, the remaining pedestrian terminals are allocated so as to minimize the number of vehicular terminals that share a tile.

Figure 5:
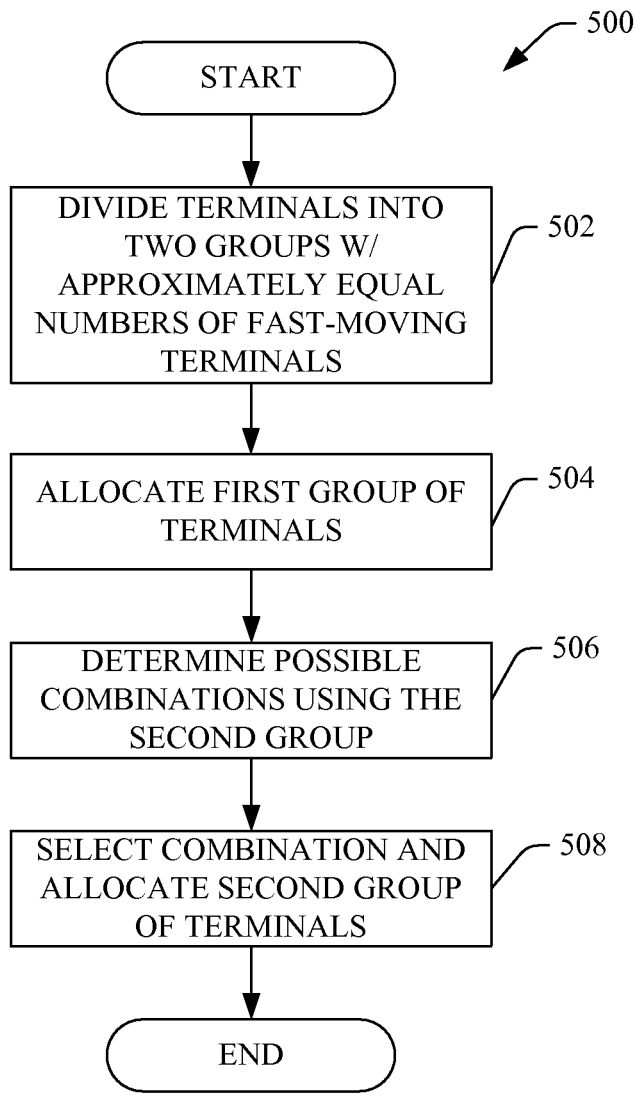
FIG. 5 illustrates a methodology for allocating resources to minimize the effects of a high interference combination in accordance with one or more aspects presented herein.

Referring now to FIG. 5, a methodology 500 for allocating terminals to minimize effects of a high interference combination is illustrated. Once it has been determined that at least one high interference combination is necessary to support a set of terminals, the access point can schedule the terminals such that probability of a given fast-moving terminal sharing a tile with another fast-moving terminal is equal for all fast-moving terminals. Occurrences of high interference combinations can be fairly or equitably distributed amongst the fast-moving terminals.

At 502, the set of terminals can be separated into two groups, where the fast-moving terminals are divided approximately equally into the two groups. As described above, one or more tree data structures can be utilized to group and manage available tiles and terminal allocations. The leaves or nodes of the tree structure can represent tiles. In particular, a first tree can represent the first terminal allocated to each tile, where a second, corresponding tree structure represents the second terminal allocated to each of the set of tiles.

At 504, the first group of terminals can be allocated to the first tree. Once the first group of terminals is allocated, the access point can determine the possible patterns or combinations for allocating the second group of terminals to the second tree at 506. In aspects, any combinations that result in excessive occurrences of high interference combinations can be eliminated from the set of possible combinations.

At 508, the access point can select one of the possible combinations or patterns for allocating the second group and allocate the second group of terminals accordingly. The selected combination can be randomly selected from the possible combinations. While the pairing of two fast-moving terminals is unavoidable, the probability of occurrence of such event is minimized. When the terminals are allocated in this manner, the random hopping scheme ensures that each fast-moving terminal will be scheduled with either another fast-moving terminal or with a pedestrian terminal. Because terminals are dynamically added and removed, the set of terminals will vary over time. Consequently the combination of terminals will change over time.

Figure 6:
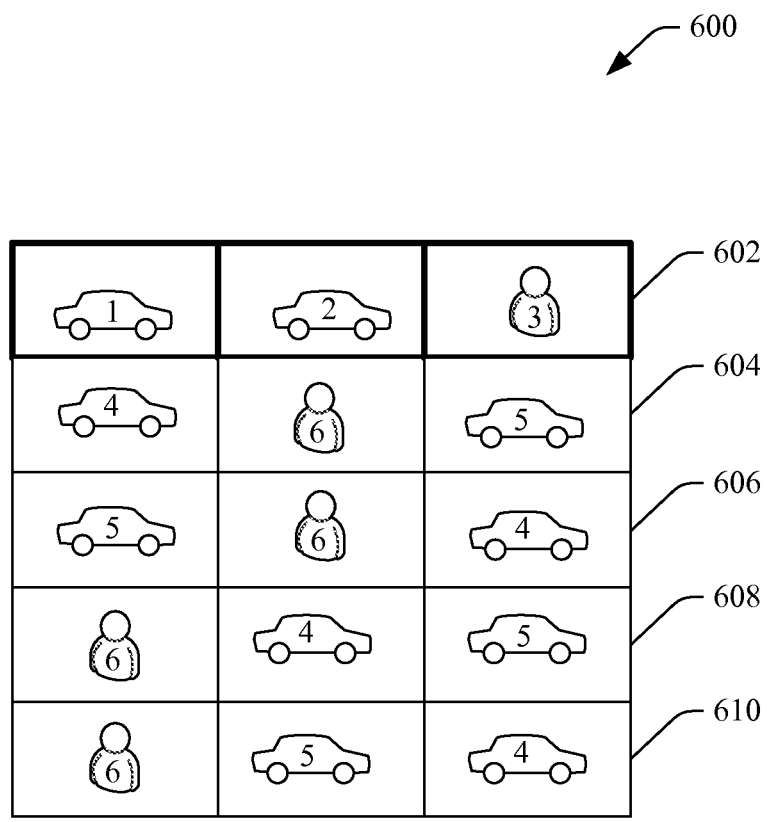
FIG. 6 illustrates an exemplary allocation of terminals including a high interference combination in accordance with one or more aspects presented herein.

Turning now to FIG. 6, exemplary allocations 600 of terminals including a high interference combination is depicted. In the example, a set of three tiles with a maximum allocation of two terminals per tile is depicted. Each column of the grid represents a tile. A set of six terminals is to be allocated, including four fast-moving terminals, depicted as vehicles, and two slow-moving terminals, depicted as pedestrians. In particular, terminals one, two, four and five are fast-moving or vehicular terminals, while terminals three and six are slow-moving or pedestrian terminals.

In accordance with the methodology described above with respect to FIG. 5, the terminals are split into two groups with the vehicular terminals split evenly between the groups. The first group of terminals includes terminals one, two and three, while the second group includes terminals four, five and six. The first group of terminals can be assigned to the tiles according to a scheme or allocation 602, depicted in FIG. 6 as the top row.

After the first group has been allocated, the access point can determine possible terminal patterns or combinations for allocating the second group of terminals. Rows 604, 606, 608 and 610 each depict a possible allocation of the second group of terminals. While other combinations or patterns are possible and can be utilized, the omitted patterns may result in excessive high interference combinations. For instance, when vehicular terminals one and four are assigned to the first tile and vehicular terminals two and five are assigned to the second tile, two high interference combinations may occur. In this example 600, only patterns that include the minimum number of high interference combinations are utilized. This restriction minimizes the number of high interference combinations.

The access point can select one of the rows 604, 606, 608 and 610 of possible combinations. Random selection helps ensure fair distribution of high interference combinations. After selection of a combination, the second group of terminals can be allocated in accordance with the selected combination.

Figure 7:
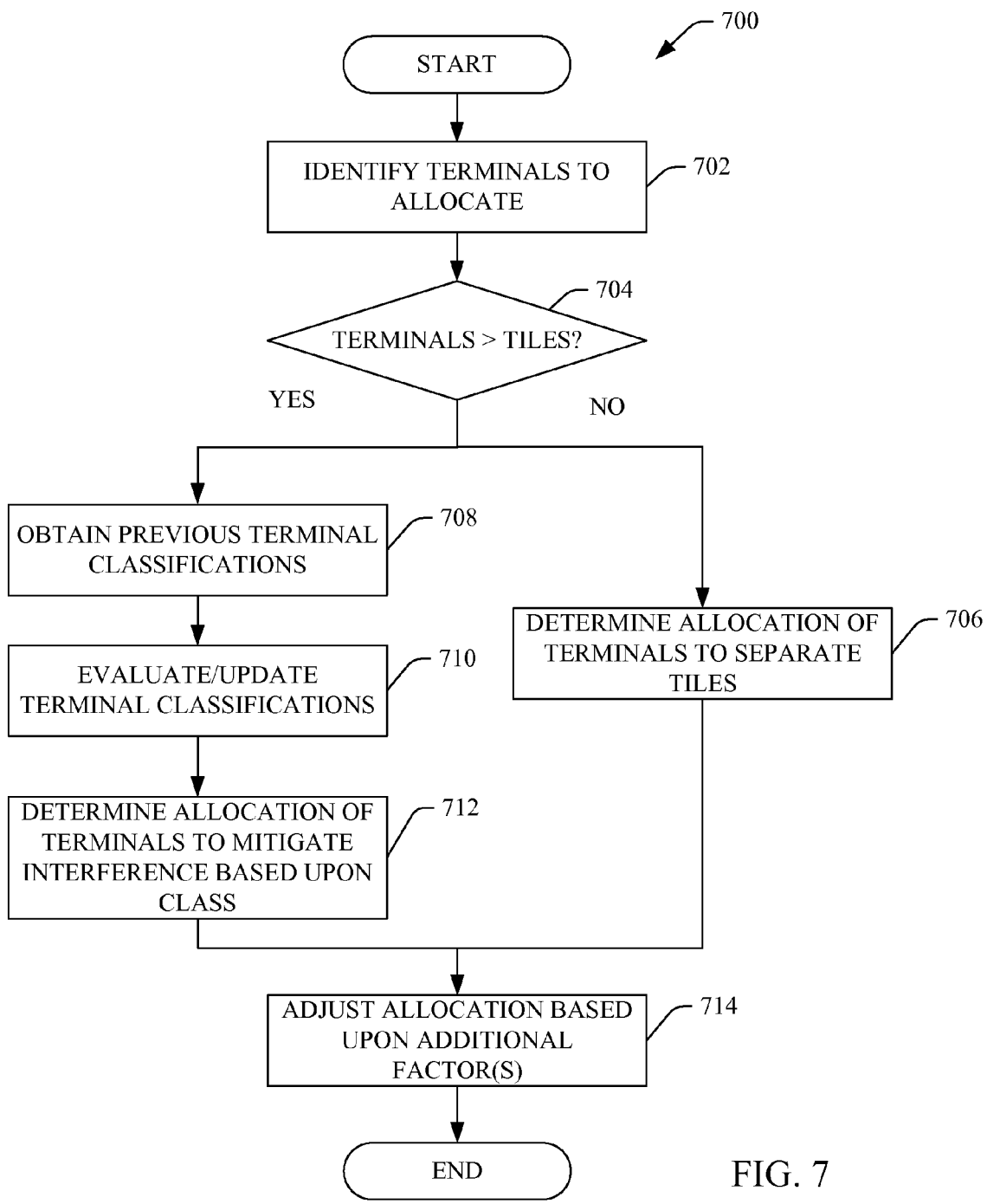
FIG. 7 illustrates a methodology for scheduling uplink transmissions to mitigate interference in accordance with one or more aspects presented herein.

Referring now to FIG. 7, a methodology 700 for scheduling uplink for a set of terminals is illustrated. At 702, terminals that are to be allocated to available tiles are identified. At 704 a determination can be made as to whether the number of identified terminals exceeds the number of available tiles. If no, then an allocation assigning each terminal to a separate tile can be generated at 706. However, if there are more terminals to be scheduled than there are available tiles, the terminals can be scheduled based at least in part upon velocity.

Prior to allocation, the terminals can be classified based upon velocity or time domain variance. For example, terminals can be classified as slow-moving or fast-moving. At 708, the access point can obtain the classifications for the set of terminals. It is likely that many of the terminals to be allocated have been previously allocated by the access point during previous scheduling processes. Consequently, classification of such terminals will have already been determined. The access point can maintain classifications for terminals supported by the access point in a cache, buffer or any other suitable memory. Accordingly, classifications for previously evaluated terminals can be retrieved from memory at 708. Additionally, any new terminals can be evaluated and classified at 710. Moreover, terminals that have been previously classified can be periodically reevaluated at 710 to determine if there has been a change in status. For example, a terminal located in a moving car may be reclassified as a slow-moving terminal once the car reaches its destination and stops.

At 712, an allocation of tiles to avoid high interference combinations can be determined utilizing the terminal classifications. Since there are more terminals than available tiles, at least one tile will have multiple terminals assigned. However, the probability of occurrence and impact of a high interference combination can be minimized.

At 714, the allocation of terminals can be adjusted as a function of an additional scheduling factor or factors. Generally, scheduling of terminals is determined based upon a number of criteria. For example, scheduling can be determined based upon transmission rates required by the various terminals. For instance, a terminal used for telephone communication requires a significantly lower data rate than a terminal accessing the Internet. Terminals having higher data rates may have priority. Consequently, the access point may attempt to schedule such terminals so as to avoid sharing resources. Accordingly, the allocation determined at either 712 or 706 can be modified based upon additional scheduling criteria. Alternatively, the access point can generate a set of weights or values associated with a terminal based upon mitigation of high interference combinations and for use in computing scheduling in combination with additional scheduling criteria.

Figure 8:
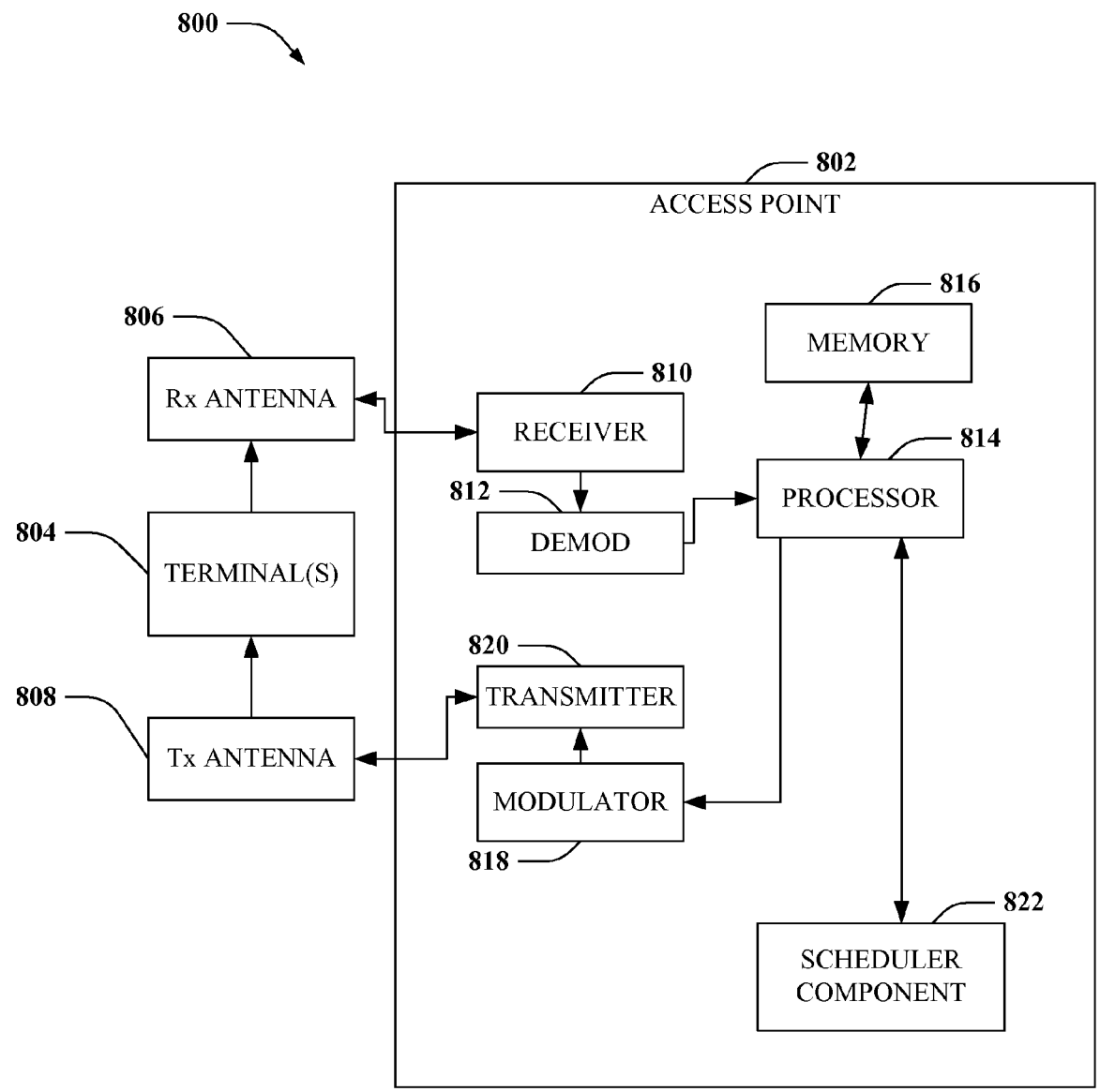
FIG. 8 illustrates a system that schedules uplink transmissions in accordance with one or more aspects presented herein.

FIG. 8 is an illustration of a system 800 that facilitates mitigation of interference in a communication environment in accordance with various aspects. System 800 comprises an access point 802 with a receiver 810 that receives signal(s) from one or more terminals 804 through one or more receive antennas 806, and transmits to the one or more terminals 804 through a plurality of transmit antennas 808. In one or more aspects, receive antennas 806 and transmit antennas 808 can be implemented using a single set of antennas. Receiver 810 can receive information from receive antennas 806 and is operatively associated with a demodulator 812 that demodulates received information. Receiver 810 can be, for example, a Rake receiver (e.g., a technique that individually processes multi-path signal components using a plurality of baseband correlators, and so on), an MMSE-based receiver, or some other suitable receiver for separating out terminals assigned thereto, as will be appreciated by one skilled in the art. According to various aspects, multiple receivers can be employed (e.g., one per receive antenna), and such receivers can communicate with each other to provide improved estimates of user data. Demodulated symbols are analyzed by a processor 814.

Processor 814 is coupled to a memory 816 that stores information related to interference, terminal classifications and the like. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 816 of the subject systems and methods is intended to comprise, without being limited to, these and any other suitable types of memory. Receiver output for each antenna can be jointly processed by receiver 810 and/or processor 814. A modulator 818 can multiplex the signal for transmission by a transmitter 820 through transmit antennas 808 to terminals 804.

Access point 802 further comprises a scheduler component 822, which can be a processor distinct from, or integral to, processor 814. Scheduler component 822 can evaluate observed interference data and terminal data, classify terminals based upon their velocity (e.g., fast-moving and slow-moving terminals) and/or allocate terminals to available tiles to mitigate interference caused by high interference combinations. It is to be appreciated that scheduler component 822 can include schedule analysis code that performs utility based analysis in connection with determining scheduling of terminals. The scheduling analysis code can utilize artificial intelligence based methods in connection with performing inference and/or probabilistic determinations and/or statistical-based determinations in connection with mitigating interference.

Figure 9:
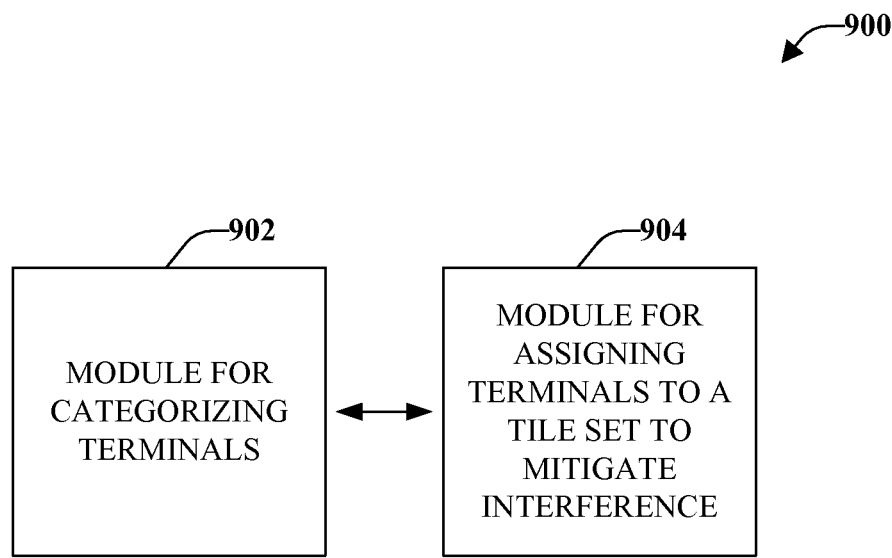
FIG. 9 is an illustration of a system that facilitates mitigation of interference in accordance with one or more aspects presented herein.

Referring now to FIG. 9, a system 900 that facilitates mitigation of interference and promotes equitable channel performance for a set of terminals is illustrated. The system 900 can include a module 902 for categorizing or grouping the terminals based upon velocity or channel time domain frequency variations. In particular, the categorization module 902 can classify terminals as fast-moving (e.g., a terminal located in a moving vehicle) or slow-moving (e.g., a terminal carried by a pedestrian. A slow-moving terminal can also include a stationary terminal.

The system 900 can also include a module 904 for assigning terminals to tiles for the scheduling of uplink transmissions. In general, the assignment module 904 can assign terminals to tiles to minimize the sharing of tiles. However, if tile sharing is required (e.g., there are more terminals than tiles), the assignment module 904 can assign terminals to avoid high interference combinations of terminals. As described above, the combination of two or more fast-moving terminals assigned to a single tile results in excessive amounts of interference and reduced performance. When such high interference combinations are inevitable, the assignment module 904 can ensure that such occurrences are randomly distributed among the set of fast-moving terminals.

Figure 10:
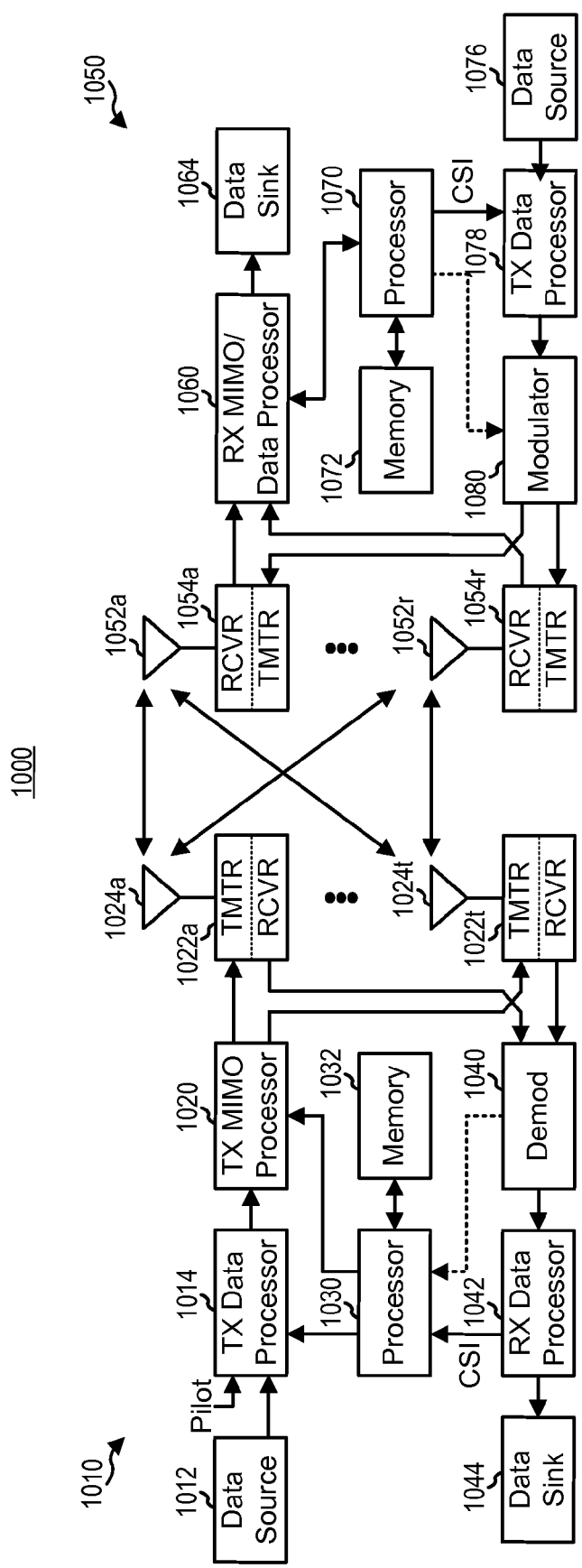
FIG. 10 is an illustration of a wireless communication environment that can be employed in conjunction with the various systems and methods described herein.

Referring to FIG. 10, one embodiment of a transmitter and receiver in a multiple access wireless communication system 1000 is illustrated. At transmitter system 1010, traffic data for a number of data streams is provided from a data source 1012 to a transmit (TX) data processor 1014. In an embodiment, each data stream is transmitted over a respective transmit antenna. TX data processor 1014 formats, codes, and interleaves the traffic data for each data stream based on a particular coding scheme selected for that data stream to provide coded data. In some embodiments, TX data processor 1014 applies precoding weights to the symbols of the data streams based upon the user and the antenna from which the symbols are being transmitted. In some embodiments, the precoding weights may be generated based upon an index to a codebook generated at the transceiver 1054 and provided as feedback to the transceiver, 1022, which has knowledge of the codebook and its indices. Further, in those cases of scheduled transmissions, the TX data processor 1014 can select the packet format based upon rank information that is transmitted from the user.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 1030. Processor 1030 can be coupled to a memory 1032 that can maintain coding scheme information. As discussed above, in some embodiments, the packet format for one or more streams may be varied according to the rank information that is transmitted from the user.

The modulation symbols for all data streams are then provided to a TX MIMO processor 1020, which may further process the modulation symbols (e.g., for OFDM). TX MIMO processor 1020 then provides $N_T$ modulation symbol streams to $N_T$ transceivers (TMTR) 1022a through 1022t. In certain embodiments, TX MIMO processor 1020 applies precoding weights to the symbols of the data streams based upon the user to which the symbols are being transmitted to and the antenna from which the symbol is being transmitted from that user channel response information.

Each transceiver 1022 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1022a through 1022t are then transmitted from $N_T$ antennas 1024a through 1024t, respectively.

At receiver system 1050, the transmitted modulated signals are received by $N_R$ antennas 1052a through 1052r and the received signal from each antenna 1052 is provided to a respective transceiver (RCVR) 1054. Each transceiver 1054 conditions (e.g., filters, amplifies, and downconverts) a respective received signal, digitizes the conditioned signal to provide samples, and further processes the samples to provide a corresponding "received" symbol stream.

An RX data processor 1060 then receives and processes the $N_R$ received symbol streams from $N_R$ transceivers 1054 based on a particular receiver processing technique to provide $N_T$ "detected" symbol streams. The processing by RX data processor 1060 is described in further detail below. The traffic data may be provided to a data sink 1064. Processor 1070 can be coupled to a memory 1072 that maintains decoding information. Each detected symbol stream includes symbols that are estimates of the modulation symbols transmitted for the corresponding data stream. RX data processor 1060 then demodulates, deinterleaves, and decodes each detected symbol stream to recover the traffic data for the data stream. The processing by RX data processor 1060 is complementary to that performed by TX MIMO processor 1020 and TX data processor 1014 at transmitter system 1010.

The channel response estimate generated by RX processor 1060 may be used to perform space, space/time processing at the receiver, adjust power levels, change modulation rates or schemes, or other actions. RX processor 1060 may further estimate the signal-to-noise-and-interference ratios (SNRS) of the detected symbol streams, and possibly other channel characteristics, and provides these quantities to a processor 1070. RX data processor 1060 or processor 1070 may further derive an estimate of the "operating" SNR for the system. Processor 1070 then provides estimated channel state information (CSI), which may comprise various types of information regarding the communication link and/or the received data stream. For example, the CSI may comprise only the operating SNR. The CSI is then processed by a TX data processor 1078, which also receives traffic data for a number of data streams from a data source 1076, modulated by a modulator 1080, conditioned by transceivers 1054*a* through 1054*r*, and transmitted back to transmitter system 1010.

At transmitter system 1010, the modulated signals from receiver system 1050 are received by antennas 1024, conditioned by receivers 1022, demodulated by a demodulator 1040, and processed by a RX data processor 1042 to recover the CSI reported by the receiver system. The demodulated signals can be provided to a data sink 1044. The reported quantized information, e.g. CQI, is then provided to processor 1030 and used to (1) determine the data rates and coding and modulation schemes to be used for the data streams and (2) to generate various controls for TX data processor 1014 and TX MIMO processor 1020.

The techniques described herein may be implemented by various means. For example, these techniques may be implemented in hardware, software, or a combination thereof. For a hardware implementation, the processing units (e.g., processors 1030 and 1070, TX data processors 1014 and 1078, TX MIMO processor 1020, RX MIMO/data processor 1060, RX Data processor 1042, and so on) for these techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor via various means as is known in the art.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for mitigating interference utilizing uplink scheduling, comprising:
    categorizing each terminal of a set of terminals as a function of channel variation; and
    allocating the set of categorized terminals to a set of tiles, wherein a terminal of a first category and a terminal of a second category are allocated the same tile, wherein terminals in the first category experience at least one of higher rates of interference and larger time domain variations than terminals in the second category, the set of tiles identifying resources for transmitting uplink signals.

2. The method of claim 1, further comprising utilizing random selection in allocation of the set of categorized terminals to minimize interference caused by a high interference combination of categorized terminals.

3. The method of claim 1, wherein velocity is indicative of the variation of channel of each of the set of terminals.

4. The method of claim 1, further comprising categorizing at least one of the set of terminals as the first category, wherein the variation of the first category is greater than the variation of a second category.

5. The method of claim 4, further comprising avoiding combinations of categorized terminals that include the at least one of the set of terminals categorized as the first category.

6. The method of claim 1, wherein categorizing the set of terminals comprising:
    analyzing previous behavior of each of the set of terminals;
    generating variation information based upon the analysis of the previous behavior; and
    comparing the variation information to a predetermined threshold.

7. The method of claim 1, further comprising:
    maintaining a categorization of each of the set of terminals; and
    retrieving the maintained categorization for use in the allocation of the set of terminals.

8. The method of claim 1, wherein the allocation of the set of terminals is based at least in part upon at least one scheduling criterion.

9. An apparatus that facilitates mitigation of interference, comprising:
    a processor configured to
        categorize each terminal of a set of terminals as a function of channel variation, and
        allocate the set of categorized terminals to a set of tiles, wherein a terminal of a first category and a terminal of a second category are allocated the same tile, wherein terminals in the first category experience at least one of higher rates of interference and larger time domain variations than terminals in the second category, the set of tiles identifying resources for transmitting uplink signals; and
    a memory coupled to the processor.

10. The apparatus of claim 9, wherein the categorization information includes at least one predetermined threshold utilized in categorizing the set of terminals.

11. The apparatus of claim 9, wherein the categorization information relates to the category associated with each of the set of categorized terminals.

12. The apparatus of claim 9, wherein the processor is further configured to utilize random selection during allocation of the set of categorized terminals to minimize interference caused by a high interference combination of categorized terminals.

13. The apparatus of claim 9, wherein the processor is further configured to categorize at least one of the set of terminals as the first category, and wherein relative time domain variations for the first category are greater than relative time domain variations for a second category.

14. The apparatus of claim 13, wherein the processor is further configured to avoid combinations of categorized terminals that include the at least one terminal of the first category.

15. The apparatus of claim 9, wherein the processor is further configured to:
analyze time domain variations for each of the set of terminals, and
compare the time domain variations to a predetermined threshold.

16. The apparatus of claim 9, wherein the allocation of the set of terminals is based at least in part upon at least one scheduling criterion.

17. An apparatus that mitigates interference, comprising:
means for categorizing each terminal of a set of terminals as a function of channel variation; and
means for assigning the set of categorized terminals to a set of tiles, wherein a terminal of a first category and a terminal of a second category are allocated the same tile, wherein terminals in the first category experience at least one of higher rates of interference and larger time domain variations than terminals in the second category, the set of tiles identifying resources for transmitting uplink signals.

18. The apparatus of claim 17, wherein velocity is indicative of the variation of each of the set of terminals.

19. The apparatus of claim 17, further comprising means for categorizing at least one of the set of terminals as the first category, wherein the variation of the first category is greater than the variation of the a second category.

20. The apparatus of claim 19, further comprising means for avoiding combinations of categorized terminals that include the at least one first category terminal.

21. The apparatus of claim 17, further comprising:
means for evaluating behavior of each of the set of terminals;
means for computing variation information based upon the evaluation; and
means for comparing the variation information for each of the set of terminals.

22. The apparatus of claim 17, further comprising:
means for persisting the categorizations for each of the set of terminals; and
means for retrieving the persisted categorizations for use in assignment of the set of terminals.

23. The apparatus of claim 17, further comprising means for modifying the assignment of the set of terminals as a function of an additional scheduling criterion.

24. A non-transitory computer-readable medium storing a computer program, wherein execution of the computer program is for:
causing at least one computer to categorize each terminal of a set of terminals as a function of channel variation; and
causing the at least one computer to allocate the set of categorized terminals to a set of tiles, wherein a terminal of a first category and a terminal of a second category are allocated the same tile, wherein terminals in the first category experience at least one of higher rates of interference and larger time domain variations than terminals in the second category, the set of tiles identifying resources for transmitting uplink signals.

25. The non-transitory computer-readable medium of claim 24 wherein execution of the computer program is also for:
causing the at least one computer to analyze time domain variations of each of the set of terminals; and
causing the at least one computer to compare the time domain variations to a predetermined threshold.

26. The non-transitory computer-readable medium of claim 24 wherein execution of the computer program is also for:
causing the at least one computer to maintain a categorization of each of the set of terminals; and
causing the at least one computer to retrieve the maintained categorization for use in the allocation of the set of terminals.

27. The non-transitory computer-readable medium of claim 24, wherein the allocation of the set of terminals is based at least in part upon at least one additional scheduling criterion.

* * * * *